(12) United States Patent
Kimura (10) Patent No.: US 8,274,582 B2
(45) Date of Patent: Sep. 25, 2012

(54) IMAGE CAPTURING APPARATUS, CONTROL METHOD THEREFOR, IMAGE PROCESSING APPARATUS, IMAGE PROCESSING METHOD, AND PROGRAM

(75) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 610 days.

(21) Appl. No.: 11/734,505

(22) Filed: Apr. 12, 2007

(65) Prior Publication Data
US 2007/0242140 A1    Oct. 18, 2007

(30) Foreign Application Priority Data
Apr. 14, 2006  (JP) .................................. 2006-112750

(51) Int. Cl.
*H04N 9/64* (2006.01)
(52) U.S. Cl. ..................................... 348/246; 348/208.4
(58) Field of Classification Search ............... 348/222.1, 348/231.2, 231.6, 231.9, 239, 241, 246, 247, 348/251; 382/219
See application file for complete search history.

(56) References Cited

U.S. PATENT DOCUMENTS

| | | | |
|---|---|---|---|
| 6,791,608 B1 | 9/2004 | Miyazawa | |
| 7,012,642 B1* | 3/2006 | Zell | 348/246 |
| 7,092,019 B1 | 8/2006 | Ogata et al. | |
| 7,440,608 B2* | 10/2008 | Silverstein | 382/149 |
| 7,636,114 B2* | 12/2009 | Aoyama | 348/246 |
| 7,864,231 B2* | 1/2011 | Sakamoto | 348/247 |
| 2002/0154828 A1* | 10/2002 | Kobilansky et al. | 382/254 |
| 2003/0174902 A1* | 9/2003 | Barkan | 382/274 |
| 2004/0041936 A1* | 3/2004 | Uchiyama | 348/335 |
| 2004/0207738 A1 | 10/2004 | Wacker | |
| 2005/0018927 A1* | 1/2005 | Manabe | 382/294 |
| 2005/0068447 A1 | 3/2005 | Steinberg et al. | |
| 2006/0115177 A1* | 6/2006 | Ishiga | 382/275 |
| 2006/0210191 A1* | 9/2006 | Silverstein | 382/275 |
| 2006/0257042 A1* | 11/2006 | Ofek et al. | 382/255 |

FOREIGN PATENT DOCUMENTS

| | | |
|---|---|---|
| JP | 09-212626 A | 8/1997 |
| JP | 11-272855 A | 10/1999 |
| JP | 2000-341582 A | 12/2000 |

(Continued)

OTHER PUBLICATIONS

Chinese Office Action that issued in Chinese Patent Application 200710096349.X, which is enclosed with English Translation.

Japanese Office Action, a copy of which is enclosed without an English Translation, that issued in Japanese Patent Application No. 2006-112750.

(Continued)

*Primary Examiner* — Aung S Moe
*Assistant Examiner* — Chriss Yoder, III
(74) *Attorney, Agent, or Firm* — Cowan, Liebowitz & Latman, P.C.

(57) ABSTRACT

An image capturing apparatus includes an image sensor which photo-electrically converts an object image, a memory which stores foreign substance area information associated with a foreign substance adhering to an optical member disposed in front of the image sensor, a positional shift detection unit which detects the mutual positional shifts between a plurality of images generated by sensing almost the same object by the image sensor, an image composition unit which positions and composites the plurality of images on the basis of the detection result obtained by the positional shift detection unit, and an image correction unit which corrects at least parts of the plurality of images on the basis of the detection result obtained by the positional shift detection unit and the foreign substance area information stored in the memory.

8 Claims, 9 Drawing Sheets

FOREIGN PATENT DOCUMENTS

| | | |
|---|---|---|
| JP | 2004-172820 | 6/2004 |
| JP | 2004-222231 | 8/2004 |
| JP | 2004-341582 | 12/2004 |
| JP | 2006-081122 A | 3/2006 |

OTHER PUBLICATIONS

European Search Report issued on Dec. 20, 2010, which is enclosed, that issued in the corresponding European Patent Application No. 07106043.8.

* cited by examiner

IMAGE CAPTURING APPARATUS, CONTROL METHOD THEREFOR, IMAGE PROCESSING APPARATUS, IMAGE PROCESSING METHOD, AND PROGRAM

BACKGROUND OF THE INVENTION

1. Field of the Invention

The present invention relates to a technique for suppressing the influence of a foreign substance adhering to the neighboring portion of an image sensor on the image quality in a digital camera or the like.

2. Description of the Related Art

In recent years, digitization of cameras are making rapid progress and, especially, a so-called digital single-lens reflex camera is becoming popular, which has the same optical layout as that of the conventional single-lens reflex camera and in which an image sensor that executes photo-electric conversion substitutes for a film. The digital single-lens reflex camera requires no film rewinding/replacement operations. Once a foreign substance enters the neighboring portion of the image sensor in the process of lens replacement or the like, the digital single-lens reflex camera continues to shoot images in which the foreign substance is captured. This degrades the quality of a series of captured images.

Japanese Patent Laid-Open No. 2004-172820 discloses a method of detecting a foreign substance from a plurality of images. According to the invention disclosed in Japanese Patent Laid-Open No. 2004-172820, the user acquires a plurality of images in advance, detects an unchangeable portion such as contrast over the plurality of images, and detects the position of the foreign substance on the basis of the unchangeable portion. The user can obtain a high-quality image by taking a picture after appropriately removing the foreign substance in a cleaning mode or the like.

Japanese Patent Laid-Open No. 2004-222231 discloses a method of correcting a change in luminance due to the presence of a foreign substance from a reference image. According to the invention disclosed in Japanese Patent Laid-Open No. 2004-222231, the camera captures an image of an object having a uniform luminance serving as a reference to generate a transmittance map from the luminance distribution obtained upon image capture. After that, the user appropriately executes gain correction for the captured image to correct a change in transmittance due to the presence of a foreign substance. This makes it possible to attain a high-quality image.

Japanese Patent Laid-Open No. 2000-341582 discloses a method of positioning a plurality of images. According to the invention disclosed in Japanese Patent Laid-Open No. 2000-341582, a plurality of images are positioned with reference to a feature point with high reliability to generate one image from the plurality of images. Appropriate composition attains a composite image having a wider dynamic range.

Unfortunately, the above-described conventional techniques pose the following problems.

The invention in Japanese Patent Laid-Open No. 2004-172820 requires the user to execute an operation such as a cleaning mode, so it cannot cope with a foreign substance adhered immediately before image capture.

The invention in Japanese Patent Laid-Open No. 2004-222231 also requires the user to execute an operation such as a cleaning mode, so it cannot cope with a foreign substance adhered immediately before image capture. In addition, if the reference image is an inappropriate one which is susceptible to texture, appropriate gain correction is impossible.

The invention in Japanese Patent Laid-Open No. 2000-341582 cannot cope with degradation in image quality due to the adhesion of a foreign substance.

SUMMARY OF THE INVENTION

The present invention has been made in consideration of the above problems, and has as its object to obtain an image which is hardly influenced by a foreign substance even when it adheres to the neighboring portion of an image sensor in an image capturing apparatus.

In order to solve the above problems and to achieve the above object, according to a first aspect of the present invention, there is provided an image capturing apparatus comprising an image sensor which photo-electrically converts an object image, storage unit configured to store foreign substance area information which is associated with a foreign substance adhering to an optical member disposed in front of the image sensor and contains at least position information of the foreign substance, positional shift detection unit configured to detect mutual positional shifts between a plurality of images generated by sensing substantially the same object by the image sensor, image composition unit configured to position and composite the plurality of images on the basis of the detection result obtained by the positional shift detection unit, and image correction unit configured to correct at least parts of the plurality of images on the basis of the detection result obtained by the positional shift detection unit and the foreign substance area information stored in the storage unit.

According to a second aspect of the present invention, there is provided an image capturing apparatus comprising an image sensor which photo-electrically converts an object image, foreign substance area detection unit configured to detect foreign substance area information which is associated with a foreign substance adhering to an optical member disposed in front of the image sensor and contains at least position information of the foreign substance, positional shift detection unit configured to detect mutual positional shifts between a plurality of images generated by sensing substantially the same object by the image sensor, image composition unit configured to position and composite the plurality of images on the basis of the detection result obtained by the positional shift detection unit, and image correction unit configured to correct at least parts of the plurality of images on the basis of the detection result obtained by the positional shift detection unit and the foreign substance area information detected by the foreign substance area detection unit.

According to a third aspect of the present invention, there is provided a method of controlling an image capturing apparatus including an image sensor which photo-electrically converts an object image, and storage unit configured to store foreign substance area information which is associated with a foreign substance adhering to an optical member disposed in front of the image sensor and contains at least position information of the foreign substance, comprising a positional shift detection step of detecting mutual positional shifts between a plurality of images generated by sensing substantially the same object by the image sensor, an image composition step of positioning and compositing the plurality of images on the basis of the detection result obtained in the positional shift detection step, and an image correction step of correcting at least parts of the plurality of images on the basis of the detection result obtained in the positional shift detection step and the foreign substance area information stored in the storage unit.

According to a fourth aspect of the present invention, there is provided a method of controlling an image capturing apparatus including an image sensor which photo-electrically converts an object image, comprising a foreign substance area detection step of detecting foreign substance area information which is associated with a foreign substance adhering to an optical member disposed in front of the image sensor and contains at least position information of the foreign substance, a positional shift detection step of detecting mutual positional shifts between a plurality of images generated by sensing substantially the same object by the image sensor, an image composition step of positioning and compositing the plurality of images on the basis of the detection result obtained in the positional shift detection step, and an image correction step of correcting at least parts of the plurality of images on the basis of the detection result obtained in the positional shift detection step and the foreign substance area information detected in the foreign substance area detection step.

According to a fifth aspect of the present invention, there is provided an image processing apparatus comprising acquisition unit configured to acquire a plurality of images generated by capturing substantially the same object by an image capturing apparatus, and foreign substance area information which is associated with a foreign substance adhering to an optical member disposed in front of an image sensor of the image capturing apparatus and contains at least position information of the foreign substance, positional shift detection unit configured to detect mutual positional shifts between the plurality of images, image composition unit configured to position and composite the plurality of images on the basis of the detection result obtained by the positional shift detection unit, and image correction unit configured to correct at least parts of the plurality of images on the basis of the detection result obtained by the positional shift detection unit and the foreign substance area information.

According to a sixth aspect of the present invention, there is provided an image processing apparatus comprising acquisition unit configured to acquire a plurality of images generated by capturing substantially the same object by an image capturing apparatus, positional shift detection unit configured to detect mutual positional shifts between the plurality of images, foreign substance area detection unit configured to detect foreign substance area information which is associated with a foreign substance adhering to an optical member disposed in front of an image sensor arranged in the image capturing apparatus and contains at least position information of the foreign substance, image composition unit configured to position and composite the plurality of images on the basis of the detection result obtained by the positional shift detection unit, and image correction unit configured to correct at least parts of the plurality of images on the basis of the detection result obtained by the positional shift detection unit and the foreign substance area information detected by the foreign substance area detection unit.

According to a seventh aspect of the present invention, there is provided an image processing method comprising an acquisition step of acquiring a plurality of images generated by capturing substantially the same object by an image capturing apparatus, and foreign substance area information which is associated with a foreign substance adhering to an optical member disposed in front of an image sensor of the image capturing apparatus and contains at least position information of the foreign substance, a positional shift detection step of detecting mutual positional shifts between the plurality of images, an image composition step of positioning and compositing the plurality of images on the basis of the detection result obtained in the positional shift detection step, and an image correction step of correcting at least parts of the plurality of images on the basis of the detection result obtained in the positional shift detection step and the foreign substance area information.

According to an eighth aspect of the present invention, there is provided an image processing method comprising an acquisition step of acquiring a plurality of images generated by capturing substantially the same object by an image capturing apparatus, a positional shift detection step of detecting mutual positional shifts between the plurality of images, a foreign substance area detection step of detecting foreign substance area information which is associated with a foreign substance adhering to an optical member disposed in front of an image sensor arranged in the image capturing apparatus and contains at least position information of the foreign substance, an image composition step of positioning and compositing the plurality of images on the basis of the detection result obtained in the positional shift detection step, and an image correction step of correcting at least parts of the plurality of images on the basis of the detection result obtained in the positional shift detection step and the foreign substance area information detected in the foreign substance area detection step.

Further features of the present invention will become apparent from the following description of exemplary embodiments with reference to the attached drawings.

DESCRIPTION OF THE EMBODIMENTS

Preferred embodiments of the present invention will be described in detail below with reference to the accompanying drawings.

(First Embodiment)

Figure 1:
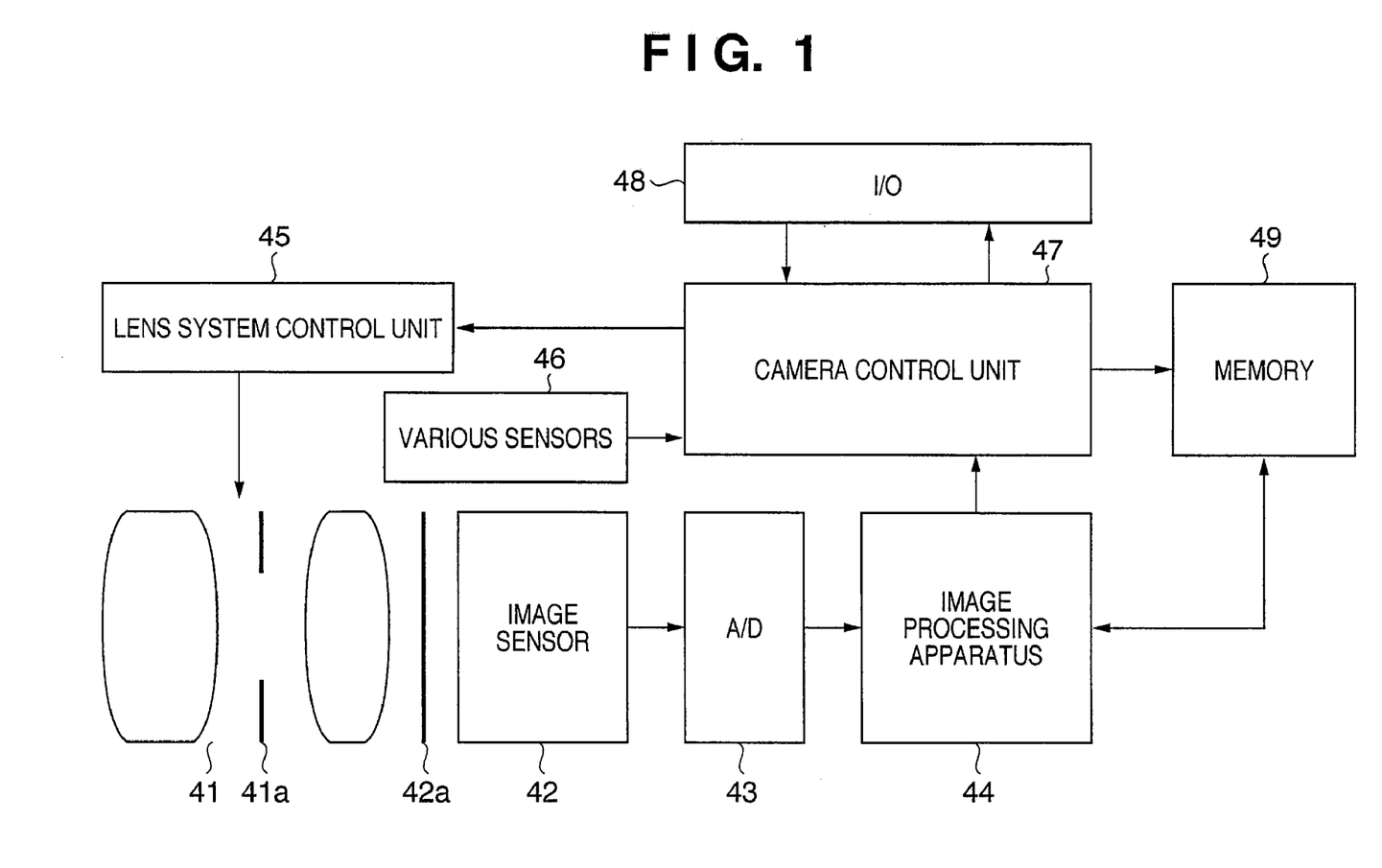
FIG. 1 is a block diagram showing the arrangement of a digital camera according to the first embodiment of the present invention.

FIG. 1 is a block diagram showing the arrangement of a digital camera according to the first embodiment of the present invention.

Referring to FIG. 1, reference numeral 41 denotes a photographing optical system which forms an object image; 41a, an aperture stop which is accommodated in the photographing optical system 41 and adjusts the amount of light that enters an image sensor 42; and 42, the image sensor which photo-electrically converts the object image. On the front surface of the image sensor 42, an optical member 42a such as a low-pass filter and cover filter is arranged in its proximity. A foreign substance adheres to the surface of the optical member 42a. The adhered foreign substance is captured in the object image on the image sensor 42 as a shadow. Reference numeral 43 denotes an A/D converter which converts an analog image signal output from the image sensor 42 into a digital signal; and 44, an image processing apparatus which processes the digital image signal output from the A/D converter 43. Reference numeral 45 denotes a lens system control unit which controls the lens position of the photographing optical system 41 and the degree of opening of the aperture stop 41a; and 46, various sensors such as an AF (Auto Focus) sensor and AE (Auto Exposure) sensor. Reference numeral 47 denotes a camera control unit which controls the operation of the overall digital camera; 48, an I/O which interfaces with a release switch, display, and the like; and 49, a memory which stores captured images and various types of information.

The digital camera acquires the user's operation via the I/O 48 and executes power ON/OFF, an image capturing operation, and the like in accordance with the user's instruction. Upon receiving an image capturing operation instruction, the camera control unit 47 decides an appropriate image capturing condition on the basis of the information obtained from the various sensors 46 or image sensor 42, and sets an appropriate lens position via the lens system control unit 45. The output signal from the image sensor 42 is digitized via the A/D converter 43 after exposure, undergoes an appropriate image process by the image processing apparatus 44, and is saved in the memory 49. A display (not shown) displays the image via the I/O 48 as needed.

The image processing apparatus 44 generally executes processes such as white balance adjustment, RGB development, and compression encoding. The image processing apparatus 44 according to the first embodiment comprises a composition unit which composites a plurality of images to generate one output image, in addition to the above processes.

Figure 2:
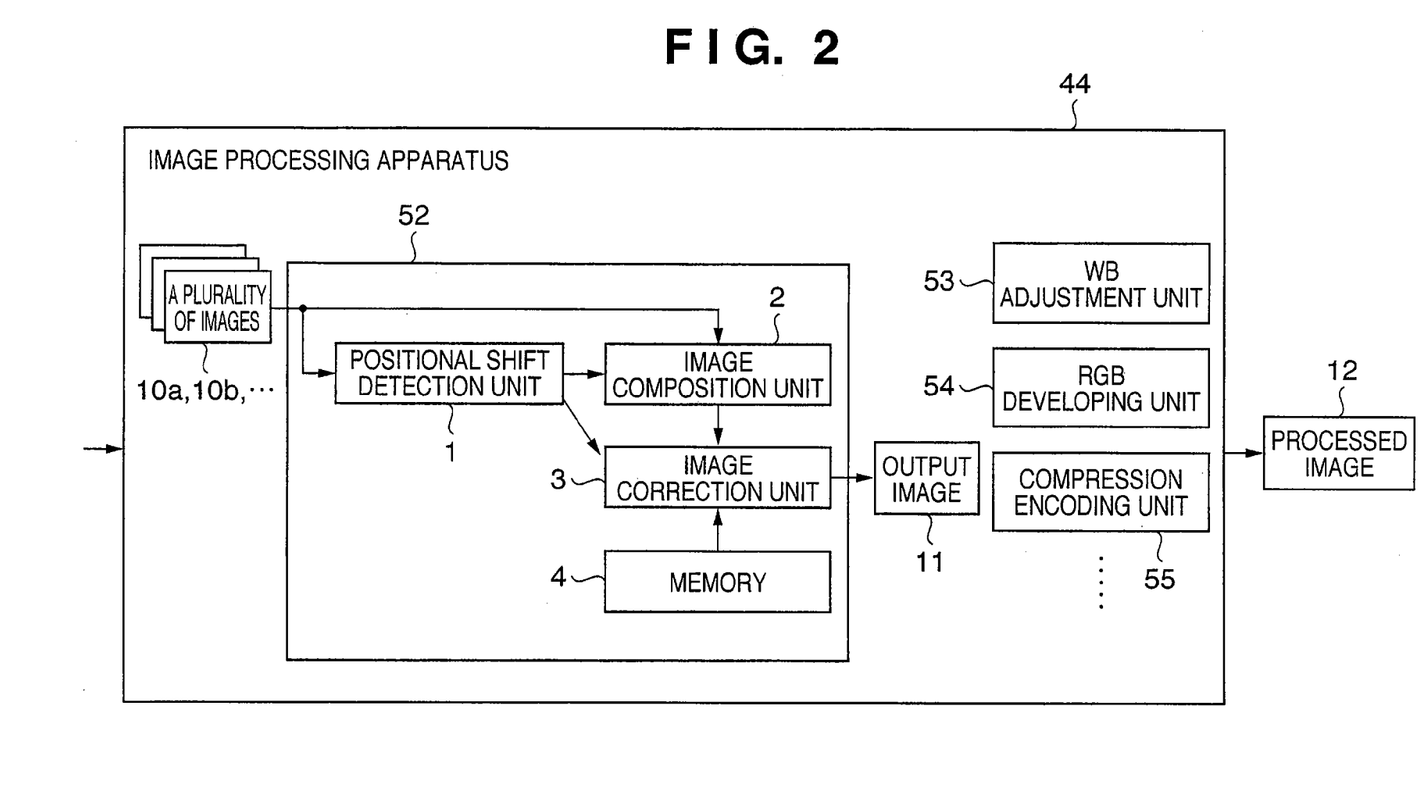
FIG. 2 is a block diagram showing the arrangement of an image processing apparatus according to the first embodiment.

FIG. 2 is a block diagram showing the arrangement of the image processing apparatus 44.

Referring to FIG. 2, reference numeral 44 denotes the image processing apparatus; 52, an image processing unit which composites and corrects a plurality of images 10a, 10b, . . . ; 53, a white balance adjustment unit; 54, an RGB developing unit; and 55, a compression encoding unit.

In the first embodiment, when, e.g., the user designates a mode for correcting image deterioration due to the presence of a foreign substance from a plurality of images, the plurality of images 10a, 10b, . . . are composited to generate one output image 11, although a detailed description thereof will be omitted. After that, the output image 11 undergoes an appropriate image process to obtain a high-quality compressed image, in which deterioration due to the presence of the foreign substance is corrected.

Figure 3:
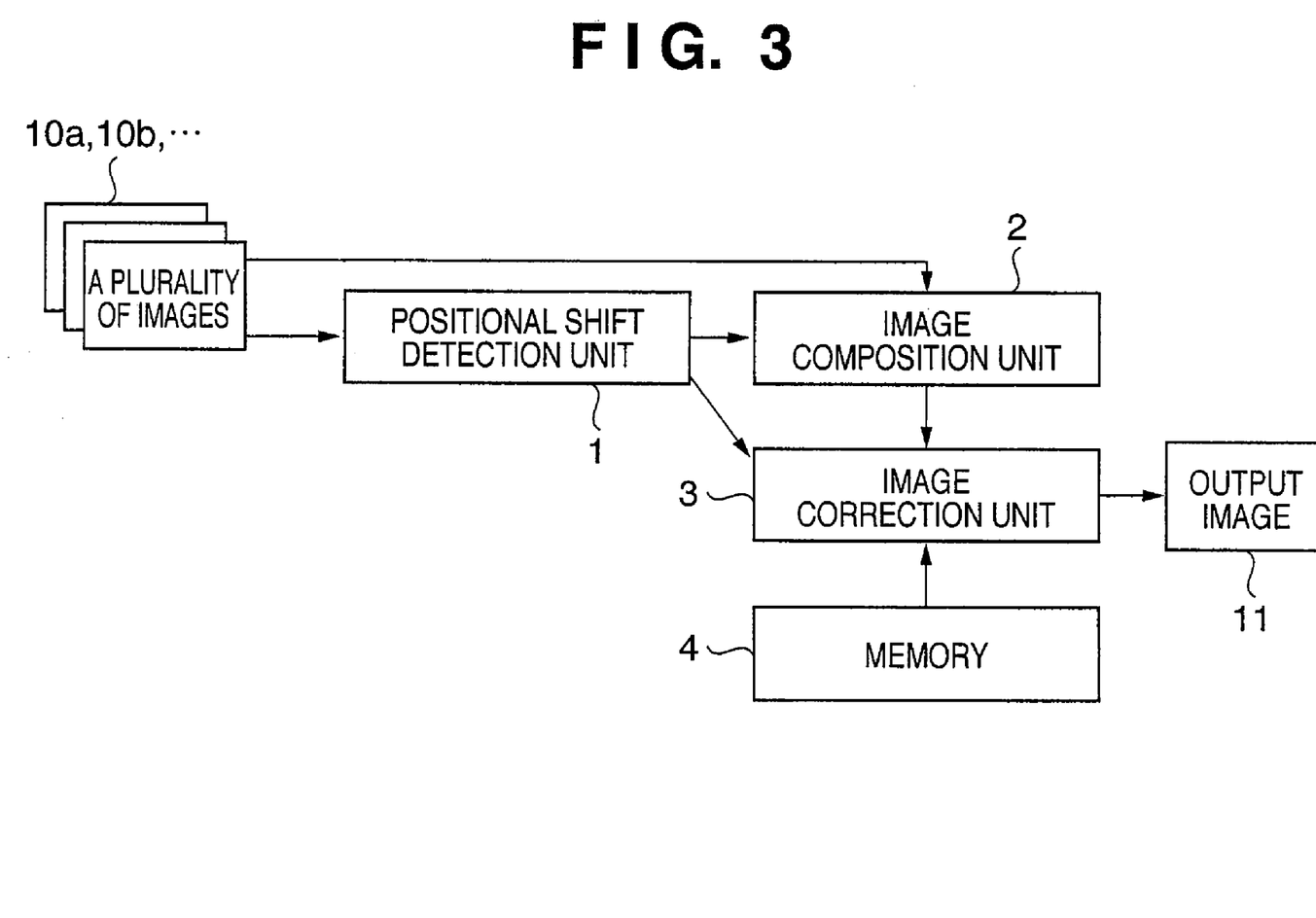
FIG. 3 is a block diagram showing an image processing unit extracted from the image processing apparatus shown in FIG. 2, and the data sequence of an image processing method according to the first embodiment.

FIG. 3 is a block diagram mainly showing the image processing unit 52 extracted from the image processing apparatus 44 shown in FIG. 2, and the data sequence of an image processing method according to the first embodiment. An image processing operation according to the first embodiment will be described with reference to FIG. 3.

The plurality of images 10a, 10b, . . . shown in FIGS. 2 and 3 will be explained here.

The plurality of images 10a, 10b, . . . shown in FIGS. 2 and 3 are images obtained by continuously shooting the same object. In the first embodiment, assume that one image is generated by continuously shooting the same object and generating and compositing a plurality of images. The reason why the same object is continuously shot to composite the plurality of captured images is as follows.

As is well known, camera shake occurs and leads to image deterioration when a shutter speed enough for image capture cannot be attained because the object exhibits low luminance. In this case, a plurality of underexposure images are captured by increasing the shutter speed from a level at which appropriate exposure can be attained but camera shake is likely to occur to a level at which camera shake is less likely to occur. These plurality of images are composited to generate one image with appropriate exposure. That is, this technique captures and composites a plurality of images with underexposure which makes camera shake negligible to obtain an image with appropriate exposure which makes the influence of camera shake inconspicuous.

In the first embodiment, the plurality of images 10a, 10b, . . . shown in FIGS. 2 and 3 are images obtained by continuous shooting for the above purpose. Note that the plurality of images 10a, 10b, . . . are not limited to images captured for camera shake correction, and may be images captured to be composited for another purpose.

An image processing operation according to the first embodiment will be explained with reference to FIG. 3.

As shown in FIG. 3, a positional shift detection unit 1 and image composition unit 2 receive the plurality of images 10a, 10b, . . . . The positional shift detection unit 1 detects the positional shifts between the plurality of images using, e.g., the method disclosed in Japanese Patent Laid-Open No. 2000-341582. The image composition unit 2 composites the plurality of images into one image by executing positioning and exposure compensation for the plurality of images on the basis of the positional shift information calculated by the positional shift detection unit 1. An image correction unit 3 generates an output image 11 by correcting the composite image on the basis of the composite image obtained by the image composition unit 2, the positional shift information between the plurality of images obtained by the image composition unit 2, and foreign substance area information stored in a memory 4. The foreign substance area information on the memory 4 is information about an area on the neighboring portion of the image sensor, within which a foreign substance detected using, e.g., the method disclosed in Japanese Patent Laid-Open No. 2004-172820 or 2004-222231 exists. This foreign substance area information is information associated with the position and size of a foreign substance existing on the optical member 42a when it is seen in a captured image.

The operations of the positional shift detection unit 1 and image composition unit 2 will be explained with reference to FIGS. 4A to 4D.

FIGS. 4A to 4D exemplify a case in which two images are to be composited, for descriptive convenience.

Figure 4A:
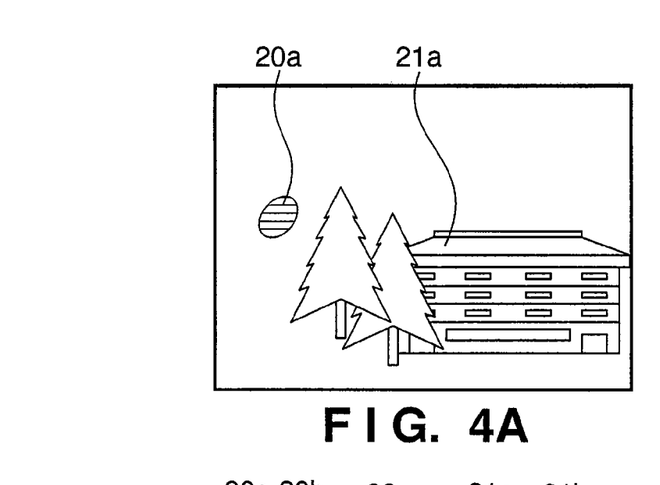
FIGS. 4A and 4B are schematic views showing two images to be given to a positional shift detection unit.
Figure 4B:
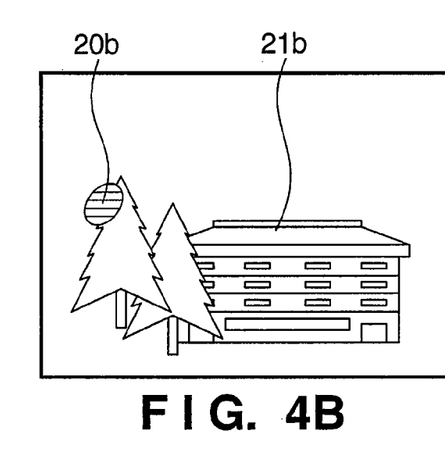
Figure 4C:
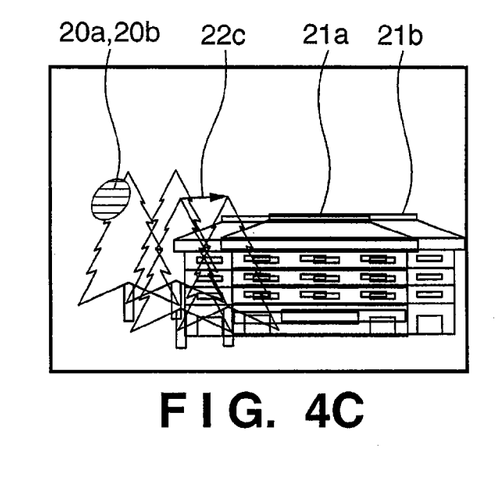
FIG. 4C is a schematic view when the two images shown in FIGS. 4A and 4B are superposed without any positioning.

FIGS. 4A and 4B show a plurality of images (two images in this case) to be given to the positional shift detection unit 1. FIG. 4C is a schematic view when the two images shown in FIGS. 4A and 4B are superposed without any positioning.

Figure 4D:
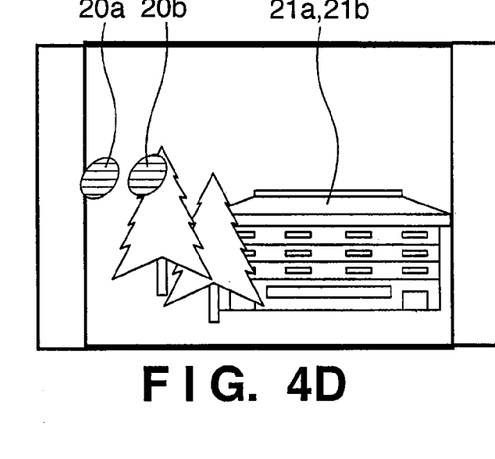
FIG. 4D is a schematic view when the two images shown in FIGS. 4A and 4B are superposed after positioning.

The positional shift detection unit 1 calculates the positional shifts between a plurality of images (two images in this case) using, e.g., the method disclosed in Japanese Patent Laid-Open Not 2000-341582. FIG. 4C shows the positional shift vector between the two images calculated at this time. The image composition unit 2 composites the two images by executing positioning on the basis of the positional shift vector between the two images calculated by the positional shift detection unit 1. FIG. 4D exemplifies the composited image.

Assume here that a foreign substance adheres to the optical member 42a. Referring to FIGS. 4A to 4D, reference numerals 20a and 20b denote areas in the two images, where the image quality is degraded due to the adhesion of the foreign substance to the optical member 42a. Reference numerals 21a and 21b denote identical objects in these two images.

When the two images are captured not to have the same picture composition, the positional shift vector calculated by the positional shift detection unit 1 takes a value other than zero. That is, a vector 22c in FIG. 4C takes a value other than a zero vector. Even when the objects 21a and 21b are identical objects, their positions on the window do not coincide with each other.

The image of the foreign substance adhering to the optical member 42a always exists at the fixed place on the window. That is, the areas 20a and 20b where the image quality is degraded due to the adhesion of the foreign substance coincide with each other in FIG. 4C in which the two images are superposed without any positioning. In contrast, when the two images are appropriately positioned and composed as shown in FIG. 4D, the positions of the objects 21a and 21b coincide with each other while those of the areas 20a and 20b where the image quality is degraded due to the adhesion of the foreign substance do not coincide with each other. That is, the composited image shown in FIG. 4D has the two areas 20a and 20b where the image quality is degraded.

The operation of the image correction unit 3 serving as the main part of the first embodiment will be explained with reference to FIGS. 3 and 5A to 5C.

The image correction unit 3 receives positional shift information (positional shift vector) calculated by the positional shift detection unit 1, a composite image composited by the image composition unit 2, and foreign substance information (e.g., the position and size of a foreign substance) stored in the memory 4 in advance. The foreign substance information is calculated in advance using, e.g., the method disclosed in Japanese Patent Laid-Open No. 2004-172820 or 2004-222231, and is accumulated on the memory 4.

Figure 5A:
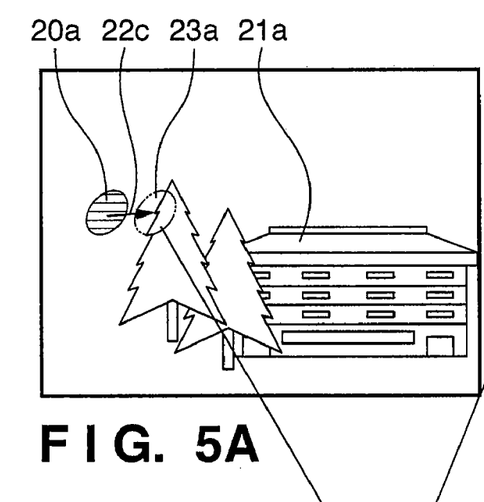
FIGS. 5A to 5C are schematic views showing two images before composition and a composited image.
Figure 5B:
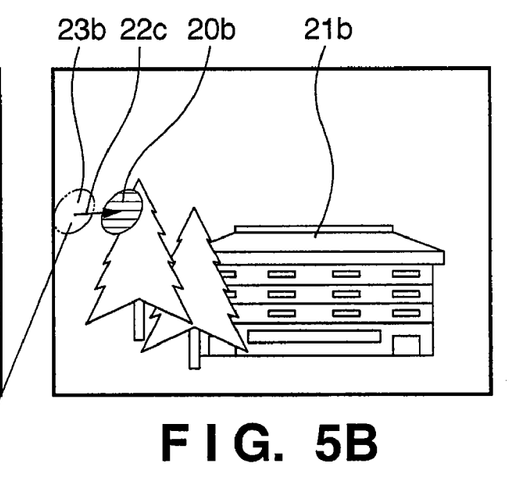
Figure 5C:
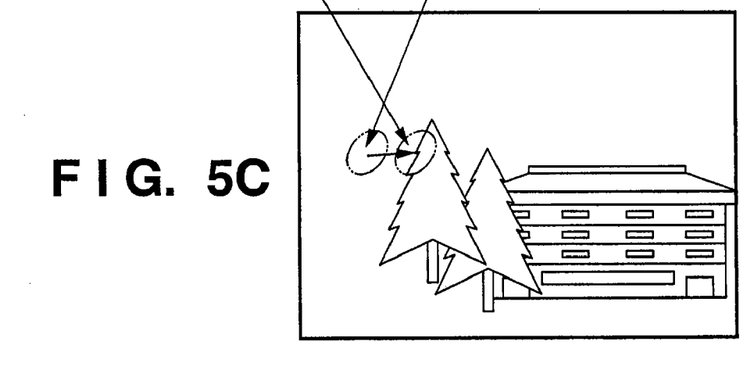

FIGS. 5A to 5C are schematic views showing two images before composition and a composited image, in which FIGS. 5A and 5B show two images before composition, and FIG. 5C shows a composited image.

Referring to FIGS. 5A to 5C, the information on the memory 4 is given as, e.g., the position and size of the foreign substance. As shown in FIGS. 5A and 5B, the foreign substance areas 20a and 20b in the two images before compositions are specified. As has been described with reference to FIGS. 4A to 4D, the positional shift detection unit 1 has already detected the positional shift information of the two images. This makes it possible to easily specify the position of the foreign substance area 20a as a foreign substance area 23b when the image shown in FIG. 5A is positioned and superposed on the image shown in FIG. 5B. Similarly, it is possible to specify the position of the foreign substance area 20b as a foreign substance area 23a when the image shown in FIG. 5B is positioned and superposed on the image shown in FIG. 5A.

Each of the foreign substance areas 23a and 23b is assumed to be a partial image corresponding to an area where the image quality is degraded in the image which does not contain the area 23a or 23b. These partial images are corrected using the images 23a and 23b free from any image deterioration. Image correction is executed using an appropriate method of, e.g., interchanging the area 20a with the area 23b, interchanging the area 20b with the area 23a, or changing the weight in weighted mean averaging of the areas 20a and 23b and the areas 20b and 23a.

The finally obtained image is the one which is generated using information about areas free from any image deterioration due to the presence of a so-called foreign substance to result in a high-quality image. Using more than two images makes it possible to more accurately take a measure against image deterioration even over a wider range.

As described above, according to the first embodiment, it is possible to suppress the capture of a foreign substance in the captured image to result in a high-quality image.

(Second Embodiment)

The block arrangement of a digital camera in the second embodiment is the same as that in the first embodiment shown in FIG. 1 except for the internal arrangement of the image processing apparatus 44.

Figure 6:
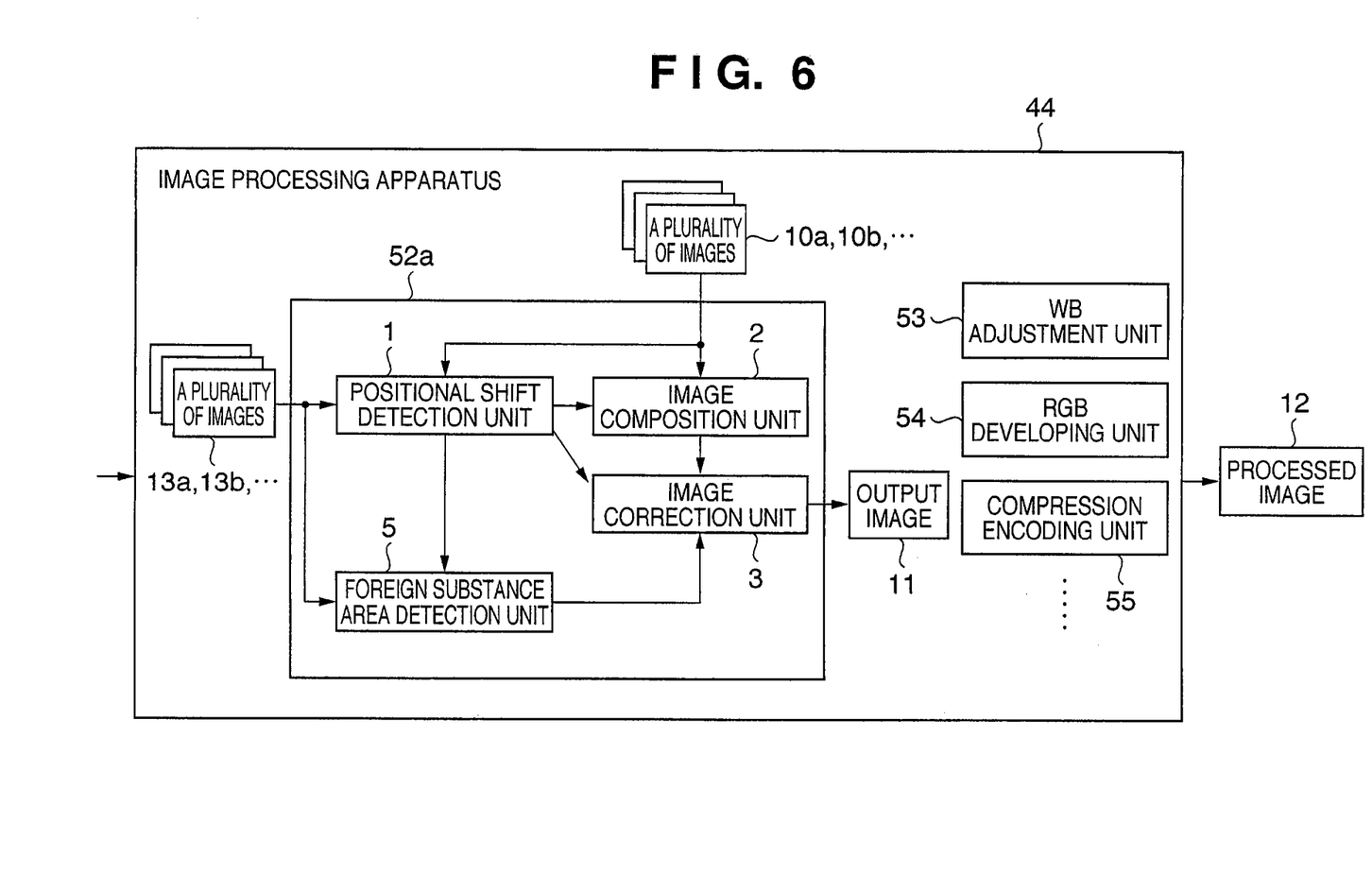
FIG. 6 is a block diagram showing the internal arrangement of an image processing apparatus according to the second embodiment.

FIG. 6 is a block diagram showing the internal arrangement of an image processing apparatus 44 according to the second embodiment. Referring to FIG. 6, reference numeral 44 denotes the image processing apparatus; 52a, a multiple image processing unit; 53, a white balance adjustment unit; 54, an RGB developing unit; and 55, a compression encoding unit. The multiple image processing unit 52a differs from the image processing unit 52 according to the first embodiment shown in FIG. 2 in that a foreign substance area detection unit 5 is provided.

The operation of the foreign substance area detection unit 5 according to the second embodiment will be explained with reference to FIG. 6.

When, e.g., the user designates a mode for correcting image deterioration due to the presence of a foreign substance from a plurality of images, the foreign substance area detection unit 5 acquires a plurality of images 10a, 10b, . . . with appropriate exposure in an aperture state designated by the user, and a plurality of images 13a, 13b, . . . obtained by narrowing down an aperture stop 41a to an extent larger than a predetermined value.

Figure 7A:
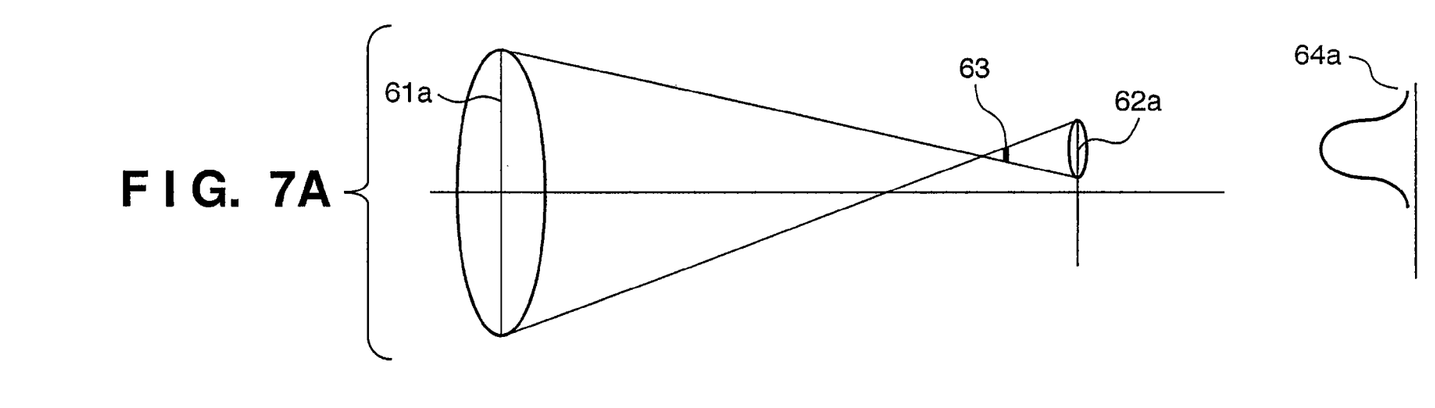
FIGS. 7A and 7B are schematic views showing the relationship between an aperture stop and an image of a foreign substance.
Figure 7B:
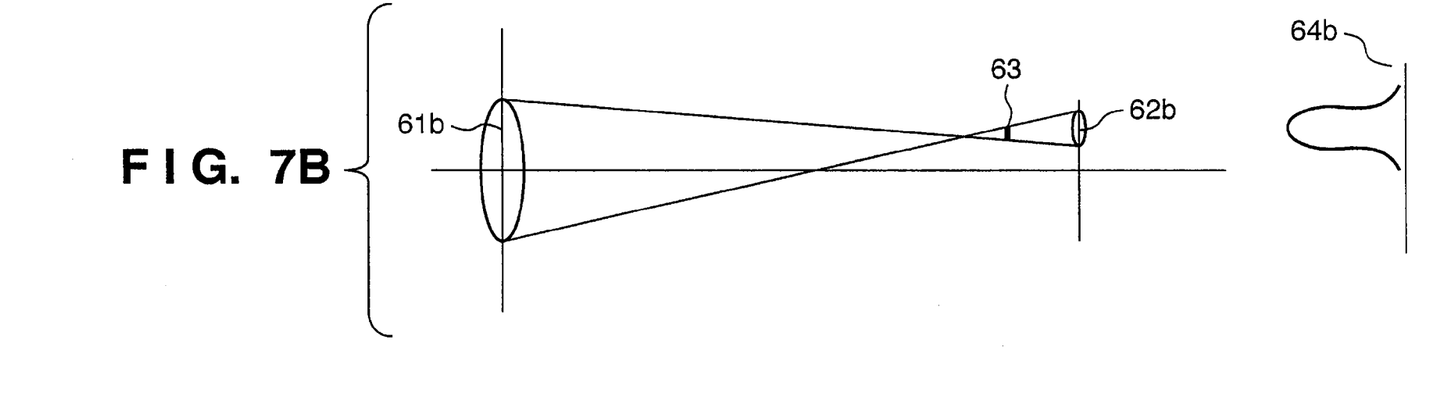

FIGS. 7A and 7B are schematic views showing the relationship between an aperture stop and an image of a foreign substance. FIG. 7A is a schematic view when the aperture stop is opened (i.e., the F-number is small). FIG. 7B is a schematic view when the aperture stop is narrowed down (i.e., the F-number is large).

Referring to FIGS. 7A and 7B, reference numerals 61a and 61b denote pupils; 62a and 62b, ranges on an image sensor, where the influence of a foreign substance reaches; 63, a foreign substance; and 64a and 64b, graphs schematically showing the magnitude of the influence of the foreign substance on the image sensor. Obviously, narrowing down the aperture stop 41a narrows the range where the influence of the foreign substance reaches, and increases the peak at the same time to lead to a greater influence on the image signal. As a result, narrowing down the aperture stop 41a makes it possible to make the image of the foreign substance clear to facilitate the detection of it. This makes it possible to improve the reliability of foreign substance detection.

The multiple image processing unit 52a detects a foreign substance using the narrowed image. On the basis of the foreign substance area information detected by this operation, the multiple image processing unit 52a corrects a plurality of images with appropriate exposure in an aperture state designated by the user to obtain an output image 11. This makes it possible to obtain a high-quality image corrected on the basis of more accurate foreign substance area information.

Figure 8:
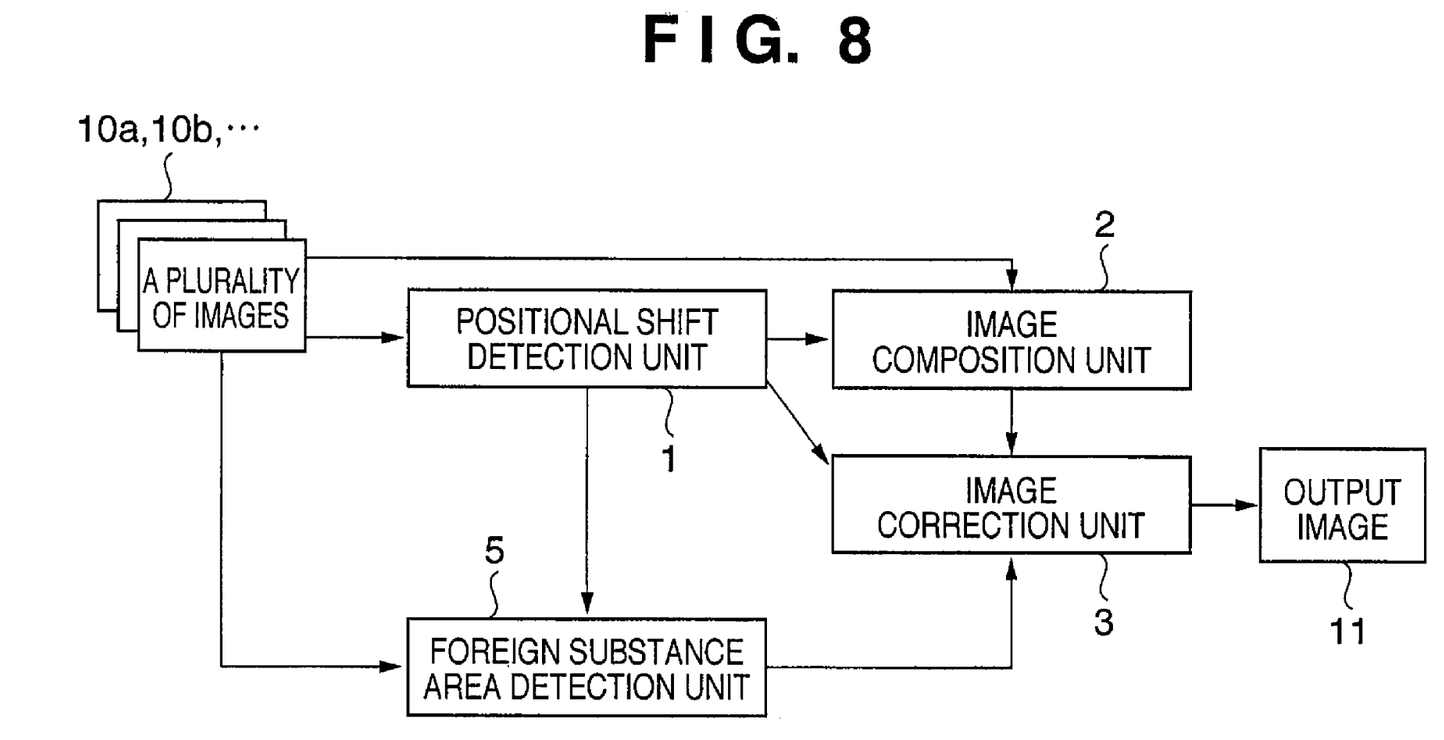
FIG. 8 is a block diagram showing an image processing unit extracted from the image processing apparatus shown in FIG. 6, and the data sequence of an image processing method according to the second embodiment.

FIG. 8 is a block diagram mainly showing the image processing unit 52a extracted from the image processing apparatus 44 shown in FIG. 6, and the data sequence of an image processing method according to the second embodiment. An image processing operation according to the second embodiment will be explained with reference to FIG. 8.

As shown in FIG. 8, a positional shift detection unit 1 and image composition unit 2 receive the plurality of images 10a, 10b, . . . . The positional shift detection unit 1 detects the positional shifts between the plurality of images using, e.g., the method disclosed in Japanese Patent Laid-Open No. 2000-341582. The image composition unit 2 composites the plurality of images into one image by executing positioning and exposure compensation for the plurality of images on the basis of the positional shift information calculated by the positional shift detection unit 1. On the basis of the plurality of images and the positional shift information calculated by the positional shift detection unit 1, the foreign substance area detection unit 5 detects foreign substance area information such as the position and size of a foreign substance using, e.g., the method disclosed in Japanese Patent Laid-Open No. 2004-172820. An image correction unit 3 generates an output image 11 by correcting the composite image on the basis of the composite image obtained by the image composition unit 2, the positional shift information between the plurality of images obtained by the image composition unit 2, and the foreign substance area information obtained by the foreign substance area detection unit 5.

The operations of the positional shift detection unit 1, image composition unit 2, and image correction unit 3 are the same as those in the first embodiment, and a repetitive description thereof will be omitted.

The operation of the foreign substance area detection unit 5 will be explained with reference to FIG. 9.

Figure 9:
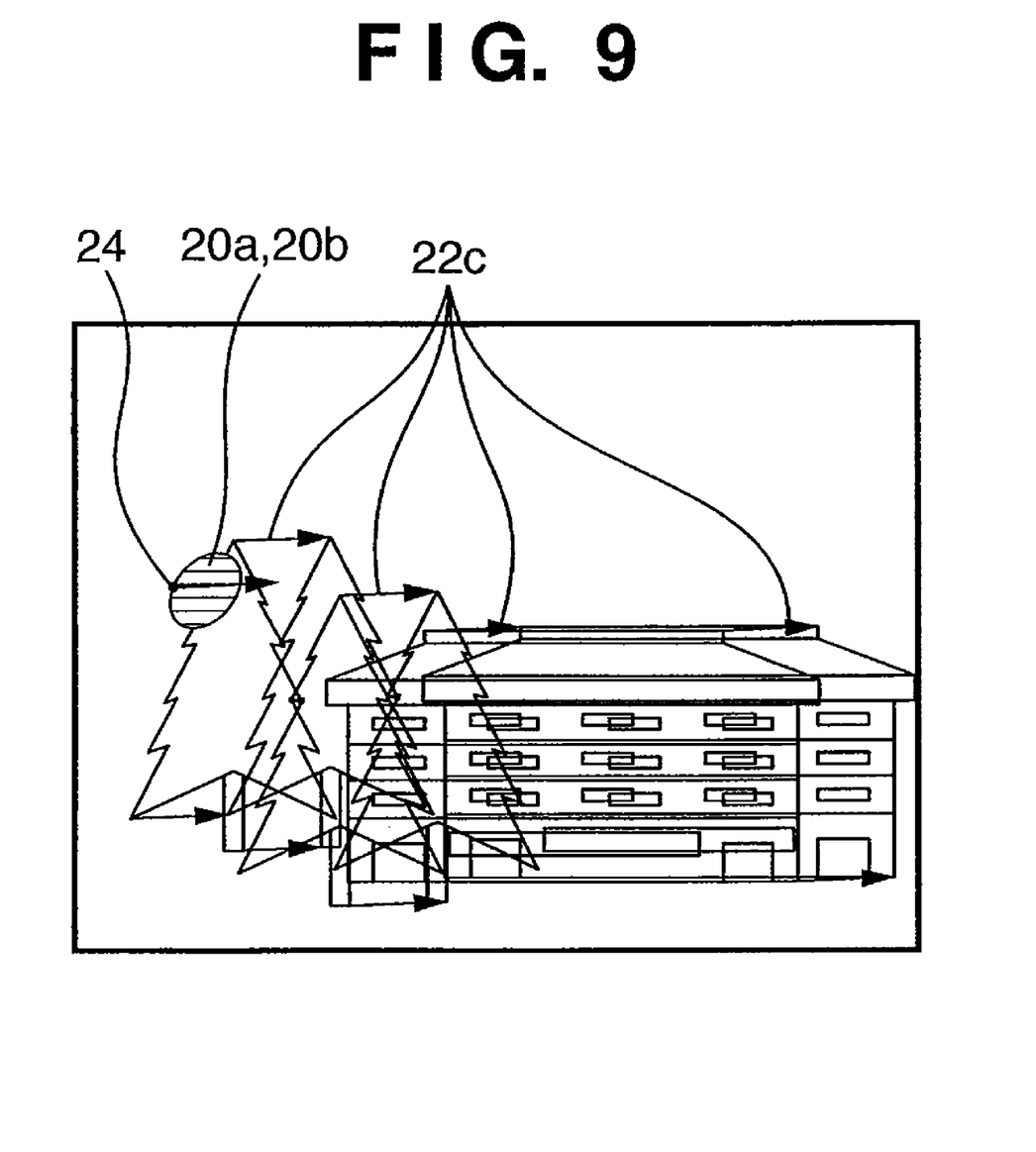
FIG. 9 is a schematic view showing an image obtained by superposing two given images without any positioning.

FIG. 9 shows an image obtained by superposing a plurality of given images (two given images in this case) without any positioning. Referring to FIG. 9, reference numerals 20a and 20b denote areas where the image quality is degraded due to the presence of a foreign substance. Also referring to FIG. 9, reference numeral 22c denotes a positional shift vector calculated by the positional shift detection unit 1.

When the positional shift detection unit 1 appropriately calculates the positional shift information, it is possible to detect corresponding feature points of a finite number of feature points extracted with reference to contrast or the like, other than feature points generated by dirt. In contrast, since a feature point generated by dirt such as a feature point 24 shown in FIG. 9 does not shift between the plurality of images, it has no point corresponding to the head of a shift vector given by the positional shift information. This principle allows the detection of an image of a foreign substance.

With, e.g., the above-described method, the position of a foreign substance is specified to give the specified position as foreign substance area information to the image correction unit 3.

The image correction unit 3 corrects the image using the method shown in the first embodiment to generate an output image.

The finally obtained image is the one which is generated using information about areas free from any image deterioration due to the presence of a so-called foreign substance to result in a high-quality image. Using more than two images makes it possible to more accurately take a measure against image deterioration even over a wider range.

The second embodiment has exemplified the case in which a plurality of images which are continuously shot with appropriate exposure are composited. However, when a plurality of images are captured with appropriate exposure without camera shake, it may be unnecessary to composite these images. In this case, a foreign substance area in one image alone may be corrected by an image of a corresponding area in the other image. This also makes it possible to eliminate the influence of the foreign substance from the image.

The first and second embodiments have exemplified the case in which a plurality of images are composited in-the camera. However, the camera may be used only to capture a plurality of images to cause an image processing apparatus outside the camera to execute an image composition process and foreign substance removal process.

More specifically, an image processing apparatus such as a PC (personal computer) is configured to incorporate the image processing unit 52 or 52a. Via a detachable recording medium or by connecting the camera and the PC, the PC can receive a plurality of images 10a, 10b, . . . , a plurality of images 13a, 13b, . . . , and foreign substance information to be input. With this arrangement, the image processing apparatus outside the camera can attain an image composition process and foreign substance removal process.

As has been described above, according to the first and second embodiments, it is possible to provide a digital camera and image processing apparatus capable of suppressing the capture of a foreign substance in the captured image to result in a high-quality image. A foreign substance can be detected in the digital camera simultaneously with image capture, or by the image processing apparatus such as a PC after image capture. This obviates the need for prompting the user to execute an operation in a cleaning mode to result in an improvement in user-friendliness. It is also possible to appropriately execute a correction operation even for a foreign substance adhered immediately before image capture.

(Other Embodiment)

The object of each embodiment is achieved even by the following method. That is, a storage medium (or recording medium) which records software program codes for implementing the functions of the above-described embodiments is supplied to the system or apparatus. The computer (or CPU or MPU) of the system or apparatus reads out and executes the program codes stored in the storage medium. In this case, the program codes read out from the storage medium implement the functions of the above-described embodiments by themselves, and the storage medium which stores the program codes constitutes the present invention. In addition to the case in which the functions of the above-described embodiments are implemented when the readout program codes are executed by the computer, the present invention incorporates the following case. That is, the functions of the above-described embodiments are implemented when the operating system (OS) running on the computer performs part or all of actual processing on the basis of the instructions of the program codes.

The present invention also incorporates the following case. That is, the program codes read out from the storage medium are written in the memory of a function expansion card inserted into the computer or a function expansion unit connected to the computer. After that, the functions of the above-described embodiments are implemented when the CPU of the function expansion card or function expansion unit performs part or all of actual processing on the basis of the instructions of the program codes.

When the present invention is applied to the storage medium, the storage medium stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-112750, filed Apr. 14, 2006, which is hereby incorporated by reference herein in its entirety.

What is claimed is:

1. An image capturing apparatus comprising:
   an image sensor which generates a plurality of images by continuously capturing same object, the plurality of images including images being captured with a predetermined aperture diameter and images being captured with a smaller diameter of aperture than the predetermined aperture diameter, at a shutter speed which is faster than a shutter speed at which appropriate exposure is obtained;
   a positional shift detection unit which detects mutual positional shift between a first image and a second image that are two images among the images being captured with the predetermined aperture diameter;
   an image composition unit which generates single composite image which has appropriate exposure level by aligning the first and second images based on a detection result of said positional shift detection unit and compositing the first and second images;
   a foreign substance area detection unit which detects a foreign substance area information that has at least position information of a foreign substance adhering to said image sensor or an optical member disposed in front of said image sensor based on the detection result of said positional shift detection unit and based on the images being captured with the smaller diameter of aperture than the predetermined aperture diameter, a foreign substance area of the first image being a first area and a foreign substance area of the second image being a second area;
   an image correction unit which corrects the images being captured with the predetermined aperture diameter based on the foreign substance area information, wherein the image correction unit corrects the first area of the first image using an area of the second image corresponding to the first area of the first image and corrects the second area of the second image using an area of the first image corresponding to the second area of the second image.

2. The apparatus according to claim 1, wherein said foreign substance area detection unit identifies the area of the second image corresponding to the first area of the first image and identifies the area of the first image corresponding to the second area of the second image by aligning the first and second images based on the detection result of said positional shift detection unit.

3. The apparatus according to claim 1, wherein said image correction unit replaces the first area of the first image by the area of the second image corresponding to the first area of the first image and replaces the second area of the second image by the area of the first image corresponding to the second area of the second image.

4. The apparatus according to claim 1, wherein said image correction unit calculates weighted average by changing weight of the first area of the first image and the area of the second image corresponding to the first area of the first image and calculates weighted average by changing weight of the second area of the second image and the area of the first image corresponding to the second area of the second image.

5. The apparatus according to claim 1, wherein said foreign substance area detection means detects, as a foreign substance area, an area which exhibits a positional shift different from positional shifts of the other portions within a window in the detection result obtained by said positional shift detection means.

6. An image processing apparatus comprising:
   an acquisition unit which acquires a plurality of images generated by continuously capturing same object by an image capturing apparatus, the plurality of images including images being captured with a predetermined aperture diameter and images being captured with a smaller diameter of aperture than the predetermined aperture diameter, at a shutter speed which is faster than a shutter speed at which appropriate exposure is obtained;
   a positional shift detection unit which detects mutual positional shift between a first image and a second image that are two images among the images being captured with the predetermined aperture diameter;
   an image composition unit which generates single composite image which has appropriate exposure level by aligning the first and second images based on a detection result of said positional shift detection unit and compositing the first and second images;
   a foreign substance area detection unit which detects a foreign substance area information that has at least position information of a foreign substance adhering to an image sensor of the image capturing apparatus or an optical member disposed in front of the image sensor based on the detection result of said positional shift detection unit and based on the images being captured with the smaller diameter of aperture than the predetermined aperture diameter, a foreign substance area of the first image being a first area and a foreign substance area of the second image being a second area;
   an image correction unit which corrects the images being captured with the predetermined aperture diameter based on the foreign substance area information, wherein the image correction unit corrects the first area of the first image using an area of the second image corresponding to the first area of the first image and corrects the second area of the second image using an area of the first image corresponding to the second area of the second image.

7. A method of controlling an image capturing apparatus having an image sensor which generates a plurality of images by continuously capturing same object, the plurality of images including images being captured with a predetermined aperture diameter and images being captured with a smaller diameter of aperture than the predetermined aperture diameter, at a shutter speed which is faster than a shutter speed at which appropriate exposure is obtained, said method comprising:
   a positional shift detection step of detecting mutual positional shift between a first image and a second image that are two images among the images being captured with the predetermined aperture diameter;
   an image composition step of generating single composite image which has appropriate exposure level by aligning the first and second images based on a detection result of said positional shift detection step and compositing the first and second images;

a foreign substance area detection step of detecting a foreign substance area information that has at least position information of a foreign substance adhering to the image sensor or an optical member disposed in front of the image sensor based on the detection result of said positional shift detection step and based on the images being captured with the smaller diameter of aperture than the predetermined aperture diameter, a foreign substance area of the first image being a first area and a foreign substance area of the second image being a second area;

an image correction step of correcting the images being captured with the predetermined aperture diameter based on the foreign substance area information, wherein the image correction step corrects the first area of the first image using an area of the second image corresponding to the first area of the first image and corrects the second area of the second image using an area of the first image corresponding to the second area of the second image.

8. A method of controlling an image processing apparatus comprising:

an acquisition step of acquiring a plurality of images generated by continuously capturing same object by an image capturing apparatus, the plurality of images including images being captured with a predetermined aperture diameter and images being captured with a smaller diameter of aperture than the predetermined aperture diameter, at a shutter speed which is faster than a shutter speed at which appropriate exposure is obtained;

a positional shift detection step of detecting mutual positional shift between a first image and a second image that are two images among the images being captured with the predetermined aperture diameter;

an image composition step of generating single composite image which has appropriate exposure level by aligning the first and second images based on a detection result of said positional shift detection step and compositing the first and second images;

a foreign substance area detection step of detecting a foreign substance area information that has at least position information of a foreign substance adhering to an image sensor of the image capturing apparatus or an optical member disposed in front of the image sensor based on the detection result of said positional shift detection step and based on the images being captured with the smaller diameter of aperture than the predetermined aperture diameter, a foreign substance area of the first image being a first area and a foreign substance area of the second image being a second area;

an image correction step of correcting the images being captured with the predetermined aperture diameter based on the foreign substance area information, wherein the image correction step corrects the first area of the first image using an area of the second image corresponding to the first area of the first image and corrects the second area of the second image using an area of the first image corresponding to the second area of the second image.

* * * * *